ional Corporation  
United States Patent [19]
Kasabian

[11] 3,840,762
[45] Oct. 8, 1974

[54] VACUUM-COOLED POWER TOOL
[75] Inventor: Jack Kasabian, Franksville, Wis.
[73] Assignee: Rockwell International Corporation, Pittsburgh, Pa.
[22] Filed: May 14, 1973
[21] Appl. No.: 359,799

Related U.S. Application Data
[63] Continuation of Ser. No. 237,016, March 22, 1972, abandoned.

[52] U.S. Cl.................. 310/50, 310/56, 310/57, 310/90
[51] Int. Cl. .......................................... H02k 7/14
[58] Field of Search................ 310/47, 50, 52–65, 310/90

[56] References Cited
UNITED STATES PATENTS
2,777,965   1/1957   Winther............................ 310/56 X
2,779,883   1/1957   Schumann........................... 310/50
3,219,855   11/1965   Zimmerman......................... 310/57

Primary Examiner—D. F. Duggan

[57] ABSTRACT

Power tools including a rotatably supported quill, an electric motor for rotating the quill, and an internal flow system connectable to a vacuum source for effecting a circulation of air through the tool to cool the motor. The bearings supporting the quill can optionally be cooled by circulating an air-oil mist through them, and the mist can be exhausted through the internal flow system to keep the oil from contacting the workpiece being processed.

12 Claims, 7 Drawing Figures

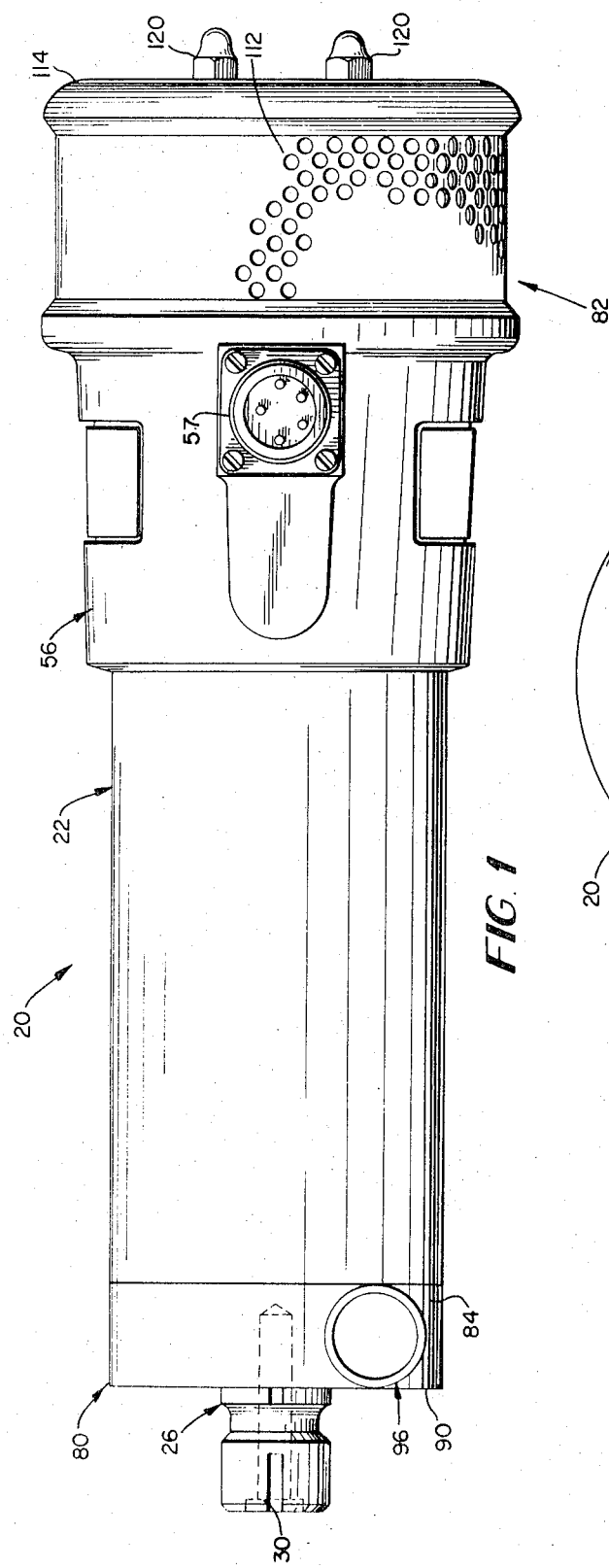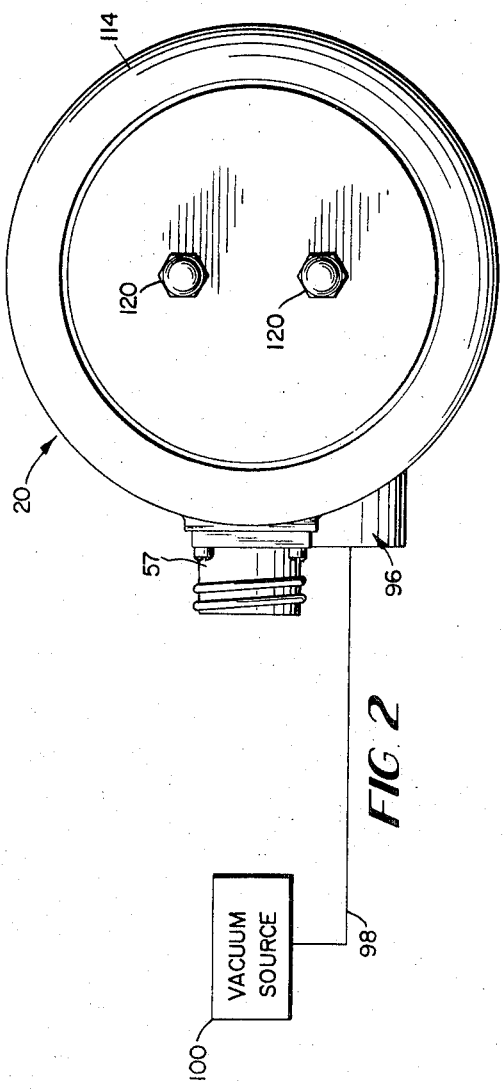

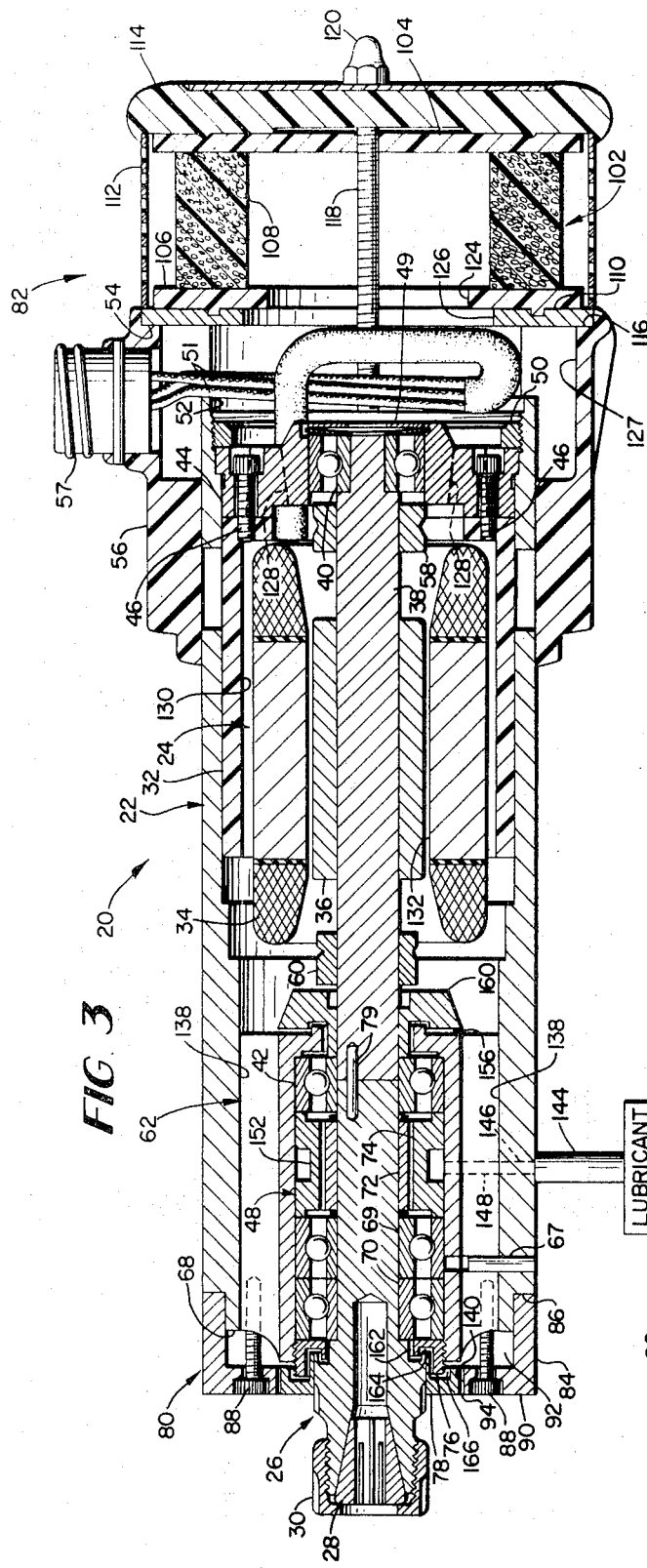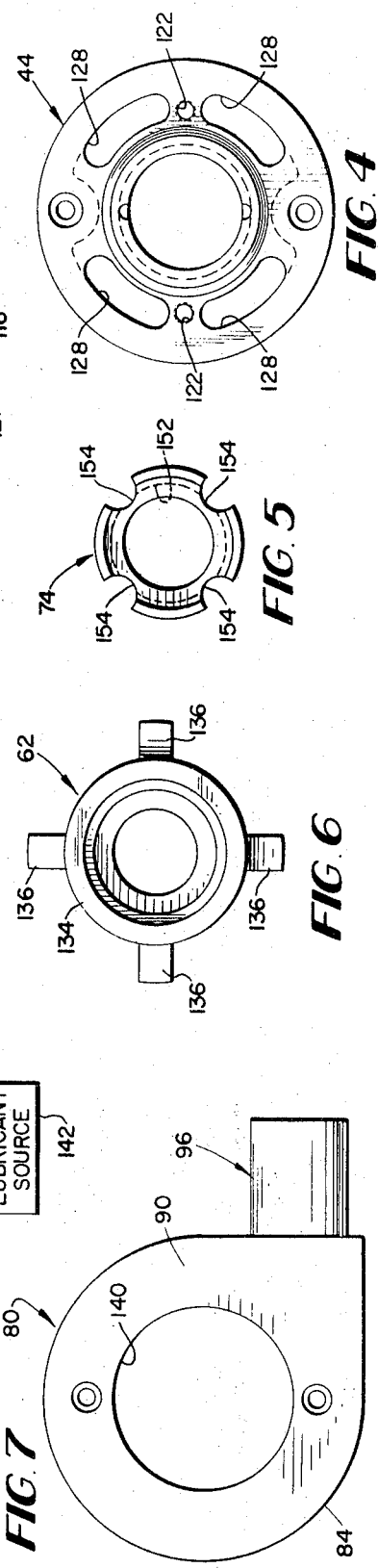

VACUUM-COOLED POWER TOOL

This is a continuation of application Ser. No. 237,016, filed Mar. 22, 1972 now abandoned.

This invention relates to power tools and, more particularly, to high speed, electric motor driven power quills and the like.

Power quills include a casing housing an electric motor and a quill or spindle to which a chuck or other accessory retaining device can be attached,[1] the quill or spindle being axially aligned with the motor output shaft. The quill is rotatably supported in the casing by rolling contact bearings located generally at opposite ends of the quill with two bearings typically being employed at the front end of the quill. The quill is connected to the motor output shaft and therefore rotated by the motor of the power quill. Power quills operate at speeds of 15,000–45,000 rpm or higher and are typically employed for precision milling, grinding, finishing, and similar operations.

[1] The term "accessory" as used herein is intended to embrace work-performing components such as drills, milling and grinding tools, routers, deburring tools, boring tools, saws, abrasive tools, polishing and other finishing tools, cutoff tools, etc. as well as other accessories which are typically mounted in chucks and collets such as flexible shafts, speed reducers, and angle drives, for example.

In the power quills heretofore available a fan mounted on the motor output shaft is employed to draw air through and around the motor to keep it from overheating. After passing the motor the air is exhausted through ports in the front or quill end of the casing to the surrounding atmosphere.

I have now developed an improved system for cooling the motors of power quills and other electric motor driven tools. In my novel system a manifold is assembled to the front end of the tool. This manifold is connected to an appropriate vacuum source when the tool is in operation. The pressure differential thus developed causes air to flow from the surrounding atmosphere through a filter into the rear or motor end of the tool, then through and around the motor of the tool and through the casing to the vacuum manifold. From the manifold the cooling air is exhausted to the vacuum producer.

One advantage of the novel arrangement I have invented is that the fan heretofore employed to effect the circulation of the cooling air can be eliminated. This makes the tool much quieter in operation, and reduces vibration, making the tool capable of producing even closer tolerances.

Another advantage which also derives from the elimination of the fan is that this allows the tool to be shortened, reducing its bulk and making it more compact.

Still another advantage of the present invention is that the tool is better protected against damage caused by contaminants penetrating through the front end of the tool to its interior. The fit between the quill and vacuum manifold can be made quite close, minimizing the likelihood that foreign material will reach the interior of the tool. Furthermore, any contaminant which does penetrate to the interior of the housing will be passed into the vacuum manifold or elsewhere into the flow system leading to the manifold and will, accordingly, be expelled from the tool to the vacuum source before it can reach the quill supporting bearings or other damage susceptible components of the tool.

Yet another advantage of the present invention is that the power heretofore needed to turn the air circulating fan is available for doing useful work. As a result, my novel tools are more efficient than those heretofore available.

In tools of the type with which the present invention is concerned the quill supporting bearings can in some circumstances advantageously be lubricated with an air-oil mist supplied from an appropriate external source. When this type of lubrication is employed, the mist is discharged into the air flow system after passing through the bearings. Thus, the mist is exhausted from the tool into the vacuum producer. This is advantageous in that the oil is thereby kept from penetrating to the exterior of the tool and contaminating or damaging the workpiece upon which the tool is operating.

From the foregoing it will be apparent that the primary object of the present invention resides in the provision of novel, improved power tools of the motor driven, rotating spindle or quill type.

Another important object of the invention resides in the provision of motor driven, rotating quill or spindle type tools which operate more quietly than those of conventional construction.

Still another important object of the invention is the provision of motor driven, rotating quill or spindle type tools which are better protected against damage by the penetration of contaminants to their interior than those of conventional construction.

A further important object of the invention resides in the provision of motor driven, rotating quill or spindle type tools which have novel, improved systems for air cooling the motor.

A still further important object of the invention is the provision of motor driven, rotating quill or spindle type tools which are more efficient than those heretofore available.

Still another important object of the invention is the provision of motor driven, rotating quill or spindle type tools in which the quill or spindle supporting bearings are lubricated by an air-oil mist and which are provided with a novel system for so evacuating the lubricant from the tool after it passes through the bearings as to keep the lubricant from penetrating to the exterior of the tool and contaminating or otherwise damaging the workpiece on which the tool is operating.

Other important objects and features and further advantages of the invention will become apparent from the appended claims and as the ensuing detailed description and discussion proceeds in conjunction with the accompanying drawing, in which:

FIG. 1 is a side view of a power quill constructed in accord with and embodying the principles of the present invention;

FIG. 2 is a rear end view of the power quill;

FIG. 3 is a longitudinal section through power quill;

FIG. 4 is an end view of a bearing insert employed in the power quill;

FIG. 5 is an end view of a bearing spacer employed in the power quill;

FIG. 6 is an end view of a housing insert employed in the power quill; and

FIG. 7 is an end view of a vacuum manifold employed in the power quill.

Referring now to the drawing, FIGS. 1–3 show a power quill 20[2] including a casing 22 which houses a motor 24 and a quill 26 provided with a chuck 28 in which an accessory can be secured by chuck nut 30. Motor 24, which is surrounded by an insulator 32, includes a field assembly 34 and an armature assembly 36 fixed to motor shaft 38 for rotation therewith. Armature assembly 36 and shaft 38 are rotatably supported in casing 22 by a bearing 40 at the rear end of the shaft and by bearing 42 at its opposite or front end.

[2] The illustrated power quill is basically a Model Super Cycle 68 available from the Precise Division of Rockwell Manufacturing Company. In view of its commercial availability the power quill will be described herein only to the extent necessary for an understanding of the present invention.

Rear bearing 40 is mounted in a bearing insert 44 to which insulator 32 is attached as by cap screws 46. Bearing 42 is part of a bearing assembly 48 which will be described below.

A retaining ring 49 and a lock ring 50 keep the bearing insert and motor output shaft in place in casing 22.

Power is supplied to motor 24 through leads identified collectively as 51. The power leads extend through an opening 52 in the rear end of casing 22 and through an opening 54 in an air filter mount 56 at the same end of the casing to a receptacle 57 fixed to the air filter mount.

Motors of the type employed in power quills rotate at extremely high speeds, making it desirable to balance the motor as accurately as possible. For this reason, balancing discs 58 and 60 are fixed to motor shaft 38 adjacent it rear and front ends respectively.

As shown in FIG. 3, a bearing insert 62 is fitted within the main casing 22 of the power quill and retained in place by pins 67. Quill 26, which extends through insert 62 and the open front end 68 of casing 22 to the exterior of the casing, is rotatably supported in the insert by the bearing system 48 mentioned previously. In addition to rear bearing 42, the bearing system includes a front cluster of bearings 69 and 70 and inner and outer spacers 72 and 74[3]. The components of the bearing system are retained in place and the bearings preloaded by a clamping ring or slinger 76 threaded into the front end of the insert. Dust cap 78 fixed to quill 26 keeps foreign material from penetrating past the quill to the interior of casing 22.

[3] The bearing system is described in detail in copending application Ser. No. 232,155 filed Mar. 6, 1972 to which the reader may refer, if desired.

Quill 26 is connected to motor shaft 38 for rotation therewith by pins 79. The copending application identified in footnote 3 also describes the illustrated shaft coupling arrangement and its advantages in detail.

One of the important features of the power quill 20 described above is a novel system for cooling its motor 24. In addition to certain components of the power quill already described, this cooling system includes a vacuum manifold 80 and a filter assembly 82. Vacuum manifold 80 has a cylindrical side wall 84 which fits into an annular recess 86 formed in the front end of casing 22. The vacuum manifold is secured in place as by cap screws 88 which extend through the end wall 90 of the manifold and are threaded into insert 62. The vacuum manifold cooperates with the insert and casing 22 to provide an annular chamber 92 at the front end of the tool.

As shown in FIG. 3, the end wall 90 of the manifold surrounds dust cap or cover 78. It is necessary to provide clearance between the rotating dust cover and the stationary manifold because of the relative movement between these components. However, the gap 94 is made as small as practical to minimize the penetration of contaminants through the front end of the tool into its interior.

Referring now to FIGS. 1, 2 and 7, a tubular fitting 96 is fixed to the side wall 84 of the vacuum manifold. This fitting communicates with the internal chamber 92 delimited by the manifold. Fitting 96 is connected by a line 98 to a conventional vacuum source 100

Referring again to FIG. 3, filter assembly 82 includes the previously mentioned filter mount 56, a filter 102 with disclike end members 104 and 106 and an annular member 108 of filter material therebetween, a seal 110, a filter screen 112, and a filter cover 114.

Seal 110 is fitted into an annular recess 116 in mount 56. Filter 102 and filter screen 112 are seated on seal 110 which therefore keeps uncleaned air from penetrating past them to the interior of the power quill as does cover 114. Cover 114 abuts one edge of screen 112 and the endpiece 106 of filter 102 and is secured in place by a pair of studs 118 and nuts 120 (at their forward ends the studs are threaded into apertures 122 in rear bearing insert 44 (see FIG. 4).

In the operation of power quill 20, air flows through casing 22 in heat transfer relationship to motor 24 because of the sub-atmospheric pressure in the chamber 92 at the front end of the tool. More specifically, with a pressure differential existing between the front and rear ends of the tool, air flows from the ambient surroundings through filter screen 112 and filter member 108 into the interior of the filter. Foreign material in the air is trapped by screen 112 or filter member 108. After passing through filter member 108, the cleaned air flows through central openings 124 and 126 in filter endpiece 104 and seal 110, an opening 127 in filter mount 56, and the opening 52 in the rear end of casing 22 to the interior of the casing. From here, the air flows through passages or slots 128 in rear bearing insert 44 into the annular space 130 between insulator 32 and the field assembly 34 of motor 24 and the annular space 132 between its field and armature assemblies, absorbing heat from the motor.

The cooling air also flows through the bearing 40 by which the rear end of the motor shaft is supported. This flow together with the flow through bearing insert slots 128, cools the bearing.

After exiting from the motor, the cooling air flows through insert 62 into the chamber 92 in manifold 80. As shown in FIGS. 3 and 6, bearing insert 62 includes a cylindrical body 134 to which longitudinally extending, radial ribs 136 are fixed. Ribs 136 space the body 134 of the insert from casing 22, providing longitudinal flow passages 138 which extend from end-to-end through the insert. Thus, after flowing through and over motor 24, the cooling air can flow through passages 138 into chamber 92 and out of the tool to the vacuum source.

As indicated previously, the advantage of the novel cooling arrangement just described is that it eliminates the fan heretofore needed to effect a flow of air through and around the motor. It was also pointed out that this considerably reduces the noise and vibration generated by a fan at the extremely high speeds at which the motors of power quills rotate.

The novel cooling air flow arrangement just described also serves a second important function. More specifically, it is impossible to provide a perfect seal in the front end of a power quill because the quill proper extends to the exterior of the tool through either an opening in its front end as in the conventional quill, or, as in the illustrated embodiment of the invention, through the opening 140 in vacuum manifold 80; and there is relative rotation between the quill and the component through which it extends. In a conventional power quill, foreign matter can penetrate through such an opening and damage the bearings or other internal components of the tool.

The illustrated tool, however, is protected against such penetration because the gap 94 between dust cover 78 and manifold 80 communicates with the chamber 92. As a consequence, any contaminates which do penetrate through gap 94 are simply carried away with the cooling air which is continuously being exhausted from the tool and never reach any component of the tool which they might damage.

It was also pointed out above that tools of the type with which the present invention is concerned can in some applications advantageously be provided with oil-mist bearing lubrication and that the novel motor cooling arrangement described previously produces even further advantages when this optional type of lubrication is employed. More specifically, an air-oil mist can be supplied from an appropriate source 142 through a conduit 144 to power quill 20. From here the lubricant flows through passages 146 and 148 in casing 22 and bearing insert 62 into an annular passage bounded by an annular recess 152 in bearing spacer 74 and insert 62. The mist then divides and flows through longitudinal passages 154 in the outer spacer to rear bearing 42 and to front bearings 69 and 70. p The rearwardly flowing lubricant circulates through rear bearing 42 and then flows into the interior of casing 22 adjacent the rear end of insert 62 through a passage 156 between insert 62 and a slinger 160 on a motor shaft 38. Here it is entrained in the air exiting from the section of the casing in which motor 24 is housed and flows with the latter into vacuum manifold chamber 92 and is exhausted from the tool.

The forwardly directed lubricant circulates through bearings 69 and 70 and then flows through a passage 162 between quill 26 and clamping ring 76, a passage 164 between the clamping ring and dust cover 78, and a passage 166 between the dust cover and insert 62 into chamber 92 where it is similarly exhausted from the tool.

The novel arrangement just described keeps the lubricant from penetrating to the exterior of the tool through the gap 94 between manifold 80 and dust cover 78. This is important in that it eliminates the possiblity of the lubricant contacting and contaminating or damaging the workpiece upon which the power quill is operating.

The invention may be embodied in devices differing considerably from that just described without departing from the spirit or essential characteristics thereof. For example, its principles are applicable to tools other than power quills and, at least in part, to devices having motive power sources other than electric motors. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A power tool or the like comprising a rotatable, bearing mounted shaft; a motor for rotating said shaft; a casing surrounding said motor, said bearings and said shaft; and means for cooling said motor and said bearings which comprises: inlet means through which air can flow into said casing, said inlet means being located at one end of said casing, a vacuum manifold located at the opposite end of said casing from said inlet means, and means providing a path through said tool between and communicating with said inlet means and said vacuum manifold along which air can flow in heat transfer relationship to said motor and said bearings to absorb heat therefrom which comprises passage means between said casing and said motor and said casing and said bearings, said manifold being connectable to a vacuum source to thereby provide a pressure differential for effecting the flow of air through said passage means.

2. The power tool of claim 1, together with means for filtering the air before it flows from the ambient surroundings into the tool casing.

3. A power tool or the like comprising a casing having an opening in one end thereof; a shaft in said casing, said shaft extending through the opening in said one end of said casing to the exterior thereof and there being sufficient clearance between said casing and said shaft to allow the shaft to rotate freely relative to the casing; bearing means supporting said shaft in said casing; and a vacuum manifold at said one end of said casing, said manifold communicating with the opening through which the shaft extends and being located between said opening and said bearing means, said manifold being connectable to a vacuum source, whereby contaminants penetrating to the interior of said casing through said opening will pass into said manifold and be evacuated from said casing before said contaminants reach said bearing means.

4. A power tool or the like, comprising a casing means; a shaft; bearing means supporting said shaft in said casing means; means for supplying a lubricant to said bearing means for circulation therethrough; and vacuum means for evacuating the lubricant from the casing means after it circulates through said bearing means, said bearing means comprising at least two bearings spaced along said shaft, there being a spacer between said bearings, and said lubricant supplying means comprising a first flow passage in said spacer intermediate the ends thereof, a second flow passage through said casing means communicating with said first flow passage, and means in said spacer providing fluid communication between said first flow passage and the ends of the spacer through which the lubricant can flow to the bearings between which the spacer is located.

5. A power tool or the like, comprising a casing means; a shaft; bearing means supporting said shaft in said casing means; means for supplying a lubricant to said bearing means for circulation therethrough; and vacuum means for evacuating the lubricant from the casing means after it circulates through said bearing means which comprises a manifold providing a chamber in said casing means and means providing passages through which the lubricant can flow to said chamber from said bearing means after circulating therethrough, said manifold being connectable to a vacuum source to thereby provide a differential pressure force for effecting a flow of the lubricant from said casing means after it circulates through said bearing means.

6. The tool of claim 5, wherein said bearing means comprises a plurality of bearings spaced along said shaft and including an insert surrounding and positioning said bearings in said casing means, there being passages extending from end-to-end of said insert through which the lubricant can flow to the vacuum manifold after circulating through at least the bearing furthest removed from the vacuum manifold.

7. The tool of claim 6, wherein said shaft extends through one end of the casing means and including a retainer fixed to said insert at the end thereof nearest that end of the casing means through which the shaft extends and a cover means fixed to said shaft adjacent said retainer, said vacuum manifold surrounding said retainer and said cover means and there being communicating passage means between said shaft and said retainer, said retainer and said cover means, and said cover means and said insert through which the lubricant can flow to said vacuum manifold from at least the bearing nearest the manifold after circulating through said bearing.

8. A power tool or the like comprising a casing means; a shaft adapted to have an accessory rotatably fixed thereto; bearing means spaced along said shaft and rotatably supporting the shaft in said casing means; an electric motor disposed in said casing means adjacent said shaft; means drive-connecting said motor to said shaft; means for cooling said motor which comprises an inlet in said casing means through which air can flow from the ambient surrounding into the casing means, said inlet means being located on the opposite side of said motor from said shaft, a vacuum manifold located on the opposite side of said bearing means from said motor, and means providing a path through the tool between the inlet means and the vacuum manifold along which air can flow in heat transfer relationship to said motor to absorb heat therefrom, said manifold being connectable to a vacuum source to thereby provide a pressure differential for effecting a flow of air into, through, and from the tool; and means for lubricating the shaft supporting bearing means which comprises means for supplying a lubricant to said bearing means for circulation therethrough and means providing fluid communication between each of said bearing means and the air flow path so located that the lubricant can flow into said path after it circulates through the bearing means.

9. The power tool of claim 8, together with a spacer between said bearing means, said lubricant supplying means comprising a first flow passage in said spacer intermediate the ends thereof, a second flow passage through said casing means communicating with said first flow passage, and means in said spacer providing fluid communication between said first flow passage and the ends of the spacer through which the lubricant can flow to the bearing means between which the spacer is located.

10. The power tool of claim 9, together with an insert surrounding and positioning said bearing means in said casing, there being passages extending from end-to-end through said insert and communicating at one end thereof with the interior of the manifold and at the other end thereof with the interior of the casing means in the vicinity of the motor and at least the bearing means nearest said end of the insert, wherby the cooling air can flow from said motor through said passages to said vacuum manifold and can induce into said passages for flow to the manifold the lubricant which has circulated through at least one of said bearing means.

11. The tool of claim 8, together with an opening in one end of said casing means, said shaft extending through said end of said casing means and said tool further including an insert surrounding and positioning said bearing means in said casing means, a retainer means fixed to said insert at that end of the casing means through which the shaft extends, and a cover means fixed to said shaft adjacent said retainer means, said vacuum manifold surrounding said retainer means and said cover means and there being communicating passage means between said shaft and said retainer means, said retainer means and said cover means, and said cover means and said insert through which the lubricant can flow to said vacuum manifold from at least the bearing means nearest the manifold after circulating through said bearing means.

12. The power tool of claim 8, wherein the inlet means is an opening in the end of the casing means opposite that at which the vacuum manifold is located and including a filter supported from said casing means and means for confining the flow of air into said opening to a path through said filter.

* * * * *